(12) United States Patent
Cree et al.

(10) Patent No.: US 11,241,817 B2
(45) Date of Patent: Feb. 8, 2022

(54) CONTROLLED PRESSURE ENCLOSURE

(71) Applicant: Addex, Inc., Newark, NY (US)

(72) Inventors: Robert E. Cree, Newark, NY (US); William J. Randolph, Farmington, NY (US)

(73) Assignee: Addex, Inc., Newark, NY (US)

( * ) Notice: Subject to any disclaimer, the term of this patent is extended or adjusted under 35 U.S.C. 154(b) by 222 days.

(21) Appl. No.: 16/421,662

(22) Filed: May 24, 2019

(65) Prior Publication Data

US 2019/0275721 A1    Sep. 12, 2019

Related U.S. Application Data

(63) Continuation of application No. 14/997,127, filed on Jan. 15, 2016, now Pat. No. 10,391,697.

(51) Int. Cl.
*B29C 48/88*   (2019.01)
*B29C 48/00*   (2019.01)
(Continued)

(52) U.S. Cl.
CPC ........ *B29C 48/913* (2019.02); *B29C 48/0018* (2019.02); *B29C 48/10* (2019.02);
(Continued)

(58) Field of Classification Search
None
See application file for complete search history.

(56) References Cited

U.S. PATENT DOCUMENTS

| 3,167,814 A | 2/1965 | Corbett |
| 3,210,803 A | 10/1965 | Najar |

(Continued)

FOREIGN PATENT DOCUMENTS

| JP | 29370/79 | 8/1999 |
| WO | 97/26126 A1 | 7/1997 |

(Continued)

OTHER PUBLICATIONS

European Patent Office (EPO), Extended European Search Report from European Patent Application No. 17739097.8 dated Jun. 28, 2019.

(Continued)

*Primary Examiner* — Monica A Huson
(74) *Attorney, Agent, or Firm* — Timothy W. Menasco, Esq.; Harter Secrest & Emery LLP

(57) ABSTRACT

The present invention relates to an external cooling system for a molten film tube produced by a blown film tubular extrusion process, comprised of one or more enclosures with one or more respective cavities that directly receive a portion of cooling gas emanating from one or more associated cooling elements. Each enclosure includes a port containing a variable exhaust device and optional flow buffer, acting to maintain a pressure differential between the cavity and an adjacent inside volume of the molten film tube, adjustable to optimize molten film tube stability cooling element efficiency and spaced apart dimension between cooling elements. Significant increases in production speeds are achieved with improved film quality over an increased range of tubular film sizes, down to a minimum size which occurs when operating at zero internal to molten film tube pressure.

22 Claims, 7 Drawing Sheets

(51) Int. Cl.
B29C 48/10 (2019.01)
B29C 55/28 (2006.01)
B29C 48/92 (2019.01)
B29C 35/16 (2006.01)
B29L 23/00 (2006.01)
B29L 31/00 (2006.01)

(52) U.S. Cl.
CPC .......... B29C 48/9125 (2019.02); B29C 55/28 (2013.01); B29C 48/92 (2019.02); B29C 2035/1658 (2013.01); B29C 2035/1666 (2013.01); B29C 2948/92514 (2019.02); B29L 2023/001 (2013.01); B29L 2031/7129 (2013.01)

(56) References Cited

U.S. PATENT DOCUMENTS

| | | | |
|---|---|---|---|
| 3,507,006 A | 4/1970 | Princen |
| 3,754,067 A | 8/1973 | Saint Eve et al. |
| 3,835,209 A | 9/1974 | Karabedian |
| 3,852,392 A | 12/1974 | Davis et al. |
| 3,867,083 A | 2/1975 | Herrington |
| 3,888,609 A | 6/1975 | Saint Eve et al. |
| 3,959,425 A | 5/1976 | Herrington |
| 3,976,732 A | 8/1976 | Herrington |
| 4,022,558 A | 5/1977 | Herrington |
| 4,115,048 A | 9/1978 | Alderfer et al. |
| 4,118,453 A | 10/1978 | Herrington |
| 4,145,177 A | 3/1979 | Schott |
| 4,174,932 A | 11/1979 | Herrington |
| 4,259,047 A | 3/1981 | Cole |
| 4,272,231 A | 6/1981 | Schott |
| 4,330,501 A | 5/1982 | Jones et al. |
| 4,447,387 A | 5/1984 | Blakeslee, III et al. |
| 4,472,343 A | 9/1984 | Kawamura et al. |
| 4,479,766 A | 10/1984 | Planeta |
| 4,632,801 A | 12/1986 | Dowd |
| 4,728,277 A | 3/1988 | Planeta |
| 4,749,346 A | 6/1988 | Planeta |
| 4,842,803 A | 6/1989 | Bose et al. |
| 5,368,460 A | 11/1994 | Weavil et al. |
| 6,273,699 B1 | 8/2001 | Finke |
| 8,956,136 B2 | 2/2015 | Zimmermann |
| 10,596,741 B2 | 3/2020 | Steuter et al. |
| 2005/0271762 A1 | 12/2005 | Cree |
| 2008/0258325 A1 | 10/2008 | Zimmermann |
| 2015/0283752 A1 | 10/2015 | Bertrand |

FOREIGN PATENT DOCUMENTS

| | | |
|---|---|---|
| WO | 2015108111 A1 | 1/2015 |
| WO | 2015/172226 A1 | 11/2015 |

OTHER PUBLICATIONS

Canadian Intellectual Property Office, Examination Report/Office Action from Canadian Patent Application No. 3,009,077 dated Nov. 27, 2020.

Canadian Intellectual Property Office, Examination Report/Office Action from Canadian Patent Application No. 3,009,077 dated Feb. 24, 2020.

International Search Report and Written Opinion for PCT/US2017/013546 (9 pages), dated Apr. 4, 2017.

CONTROLLED PRESSURE ENCLOSURE

BACKGROUND OF THE INVENTION

Field of the Invention

The present disclosure relates to a method and apparatus for cooling. The present disclosure relates more particularly to a method and apparatus for high performance cooling.

Description of Related Art

Various methods to manufacture thermoplastic blown films are well known in the plastics art, and typically involve forming a continuous, vertically oriented, seamless, annular plastic film commonly referred to as the "tube" or "bubble". Thermoplastic material is melted and pumped by an extruder through a blown film die (die), exiting as an annular flow of a molten film, continuously drawn upward by a pair of driven squeeze rollers. Gas is typically manually injected through the die to the interior of the exiting annular flow of molten film. The driven squeeze rollers act to prevent gas from escaping, trapping the injected gas inside, forming a molten film tube which is inflated by the injected gas until at the desired size and the die is sealed off to prevent inflation gas from escaping. The molten film tube is pulled upward by the driven squeeze rollers, flowing generally upward from the die through a cooling system, where it stretches, expands, and cools around the now trapped column of injected gas until it solidifies at a frost line into a solidified film tube. The solidified film tube passes through various stabilizers and enters a flattening device, which converts the tube into a flattened double thickness thermoplastic sheet of film known as "lay-flat". The lay-flat passes through the driven squeeze rollers, and is conveyed to downstream converting equipment such as winders and bag making machines for further processing.

To remain competitive, manufacturers of blown film must maximize throughput rate and quality, however cooling system performance is a significant limiting factor. The weight of thermoplastic that is extruded per unit time divided by the circumference of the die exit, provides a commonly used measure of throughput performance, and is expressed in units of PPH/Inch, Pounds Per Hour per Inch of die exit circumference. Many different cooling systems have been developed and employed, both external and internal to the tube, and to varying degrees these systems have achieved commercial success.

Blown film cooling systems provide a flow of cooling gas typically external, but in many cases also internal to the molten film tube. Cooling systems are designed using well known Bernoulli and Coandă principles, and in many cases, apply the cooling gas to flow generally along the surface of the molten film tube to create holding forces on the molten film tube, providing for both stability and cooling of the molten film tube. Excessive holding forces, if present, can cause vibration, flutter, and high noise levels in the process, and can pull the molten film tube into undesirable contact with the cooling element, creating drag and causing marks and instability in the molten film tube. In other cases, cooling gas is instead applied generally against the surface of the molten film tube, typically creating turbulent cooling with repelling forces, requiring a separate means to stabilize the molten film tube.

External cooling systems, generally provide the primary means for stabilization and cooling of the molten film tube, are generally easy to operate and used on most blown film extrusion processes. External cooling systems provide a flow of cooling gas along the outside surface of the molten film tube that typically generates holding forces while cooling the molten film tube, until the cooling gas dissipates into the surrounding atmosphere. Less typically, cooling gas is aimed generally inward generating repelling forces while cooling the molten film tube, undesirably requiring a separate means to hold and stabilize the molten film tube.

Present art external cooling systems are made up of various types of cooling elements. The earliest cooling element, known as a "Single Flow air ring", still in common use today, applies a single flow of cooling gas around the molten film tube. Single Flow cooling elements typically produce good film quality, but at lower throughput rates. Additional flows of cooling gas have been added to cooling elements over time to create various multiple flow designs, such as "Dual Flow", "Triple Flow" or "Quad Flow" designs, and some external cooling systems pair cooling elements into various configurations, depending on the application, to form what is generically known as a "Tandem" air ring. External cooling systems are typically fixed in place, but can be made adjustable in height above the die to allow extending the cooled surface area along the molten film tube, producing higher throughput, but also resulting in greater unsupported surface area between the cooling element and die, which is the hottest and weakest portion of the molten film tube, which can lead to degraded stability, making it more difficult to operate and potentially leading to a narrower range of film sizes.

In contrast, internal cooling systems typically do not provide primary stabilization, and are selectively used typically to generate additional throughput beyond the capability of an external cooling system. Internal cooling systems replace manual gas injection and inflate the molten film tube with a flow of an internal supply gas that enters through the die. Although some recent high throughput internal cooling systems apply cooling gas to create holding forces, more typically cooling gas is directed against the inside surface of the molten film tube, acting to generally repel and cool the inside surface of the molten film tube. The flow of internal supply gas is trapped inside the bubble and cannot dissipate into the atmosphere, therefore complex control systems are used to balance a flow of internal exhaust gas that exits through the die to maintain a constant bubble size as is well known and understood by those skilled in the art. Internal cooling systems can be difficult or even impossible to use depending on such factors as operator skill, thermoplastic material properties, and the physical size and design of the associated die.

It is highly desired to overcome the drawbacks of prior art thermoplastic cooling systems and provide a cooling system that significantly increases throughput rate, maximizes aerodynamic holding forces, allows relatively large unsupported regions of the molten tube with good stability, produces a wide range of film sizes, prevents drag on the molten film surface, minimizes turbulence, vibration and flutter, does not produce high sound power levels, and is simple and easy to control.

SUMMARY OF THE INVENTION

In view of the foregoing, it is an object of the present disclosure to provide a method and apparatus for cooling.

A first exemplary embodiment of the present disclosure presents an apparatus for cooling. The apparatus includes at least one enclosure including a cavity with operational extents further defined by a molten film cavity portion and a cooling element cavity portion. The cavity operable for receiving at least a portion of cooling gas from at least one cooling element, wherein the at least one enclosure is operable to maintain a predetermined pressure differential between an inside surface and an outside surface of the molten film cavity portion.

A second exemplary embodiment includes wherein the predetermined pressure differential maintains a stability of the molten film cavity portion and a cooling efficiency of the at least one cooling element.

A third exemplary embodiment includes wherein the at least one enclosure further including at least one port maintaining a variable exhaust device operable for moving a portion of cooling gas from the cavity through the at least one port to a surrounding atmosphere to maintain the predetermined pressure differential.

A fourth exemplary embodiment includes wherein the apparatus further includes a flow buffer including a passage into the cavity, the passage fluidly connecting the cavity to the surrounding atmosphere.

A fourth exemplary embodiment of the present disclosure presents a method for cooling. The method includes receiving, by at least one enclosure, at least a portion of cooling gas from at least one cooling element, the at least one enclosure includes a cavity with operational extents further defined by a molten film cavity portion and a cooling element cavity portion. The method further includes maintaining, by the at least one enclosure, a predetermined pressure differential between an inside surface and an outside surface of the molten film cavity portion.

The following will describe embodiments of the present invention, but it should be appreciated that the present invention is not limited to the described embodiments and various modifications of the invention are possible without departing from the basic principles. The scope of the present disclosure is therefore to be determined solely by the appended claims.

DETAILED DESCRIPTION OF THE INVENTION

Figure 1:
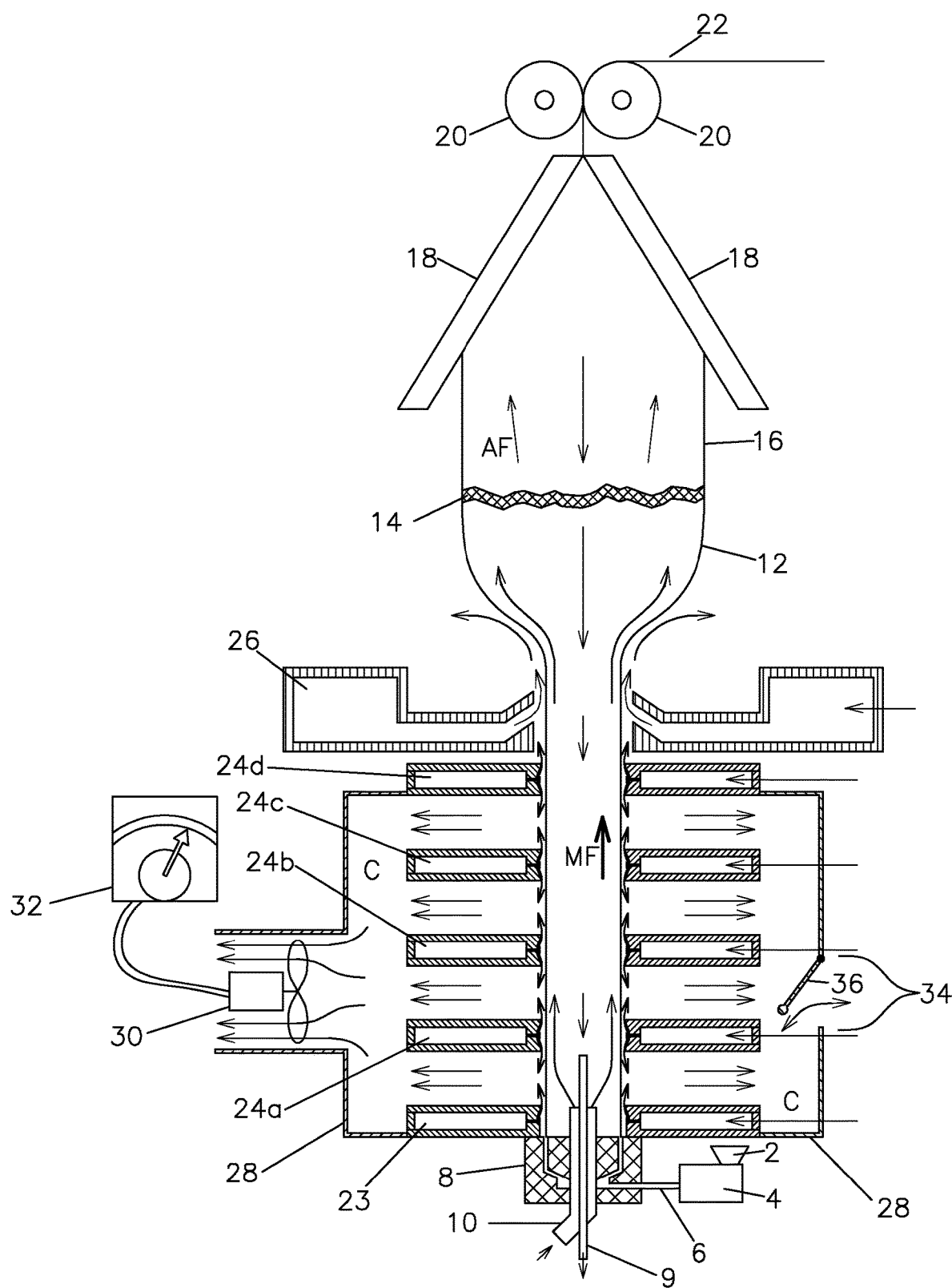
FIG. 1 is a cross sectional view of a device suitable for use in practicing exemplary embodiments of this disclosure.

Exemplary embodiments of the present disclosure relate to a high performance cooling system for the blown film tubular extrusion process providing increased throughput rate at high quality. Embodiments of the high performance cooling system include one or more enclosures or controlled pressure enclosures, creating a gas volume cavity (cavity) around the molten film tube that is isolated from the surrounding atmosphere. The cavity directly receives at least a portion of cooling gas that emanates, generally along the outside surface of the molten film tube, from one or more associated cooling elements. The extents of the cavity are formed by the combination of enclosure walls, the portion of the cooling elements in contact with the cavity (also referred to as the cooling element cavity portion), and the portion of the molten film tube in contact with the cavity (also referred to as the molten film cavity portion).

Each enclosure incorporates a variable exhaust device that adjustably transfers gas through a port in the enclosure, from the associated cavity to the surrounding atmosphere, allowing for pressure adjustment relative to the surrounding atmosphere of the cavity within each enclosure. A substantially constant internal tube pressure, usually much less than 1" H2O (relative to the surrounding atmosphere), is generated as the molten film tube stretches and forms around the trapped internal gas volume contained within the molten film tube. Resulting cavity pressure acts directly on the outside surface of the molten film cavity portion, and internal tube pressure acts directly on the inside surface of the molten film cavity portion, to create a predetermined pressure differential across the molten film cavity portion. The predetermined pressure differential is adjusted to maximize the stability of the molten film cavity portion and the cooling efficiency of the cooling element cavity portion, to provide higher throughput rate, and better film quality.

The variable exhaust device preferably would be a fan means, chosen with operating characteristics incapable of creating a predetermined pressure differential large enough to stretch the flow of the molten film tube and thus the molten film cavity portion in between the cooling elements and hang up on associated cooling elements, causing an interruption in the flow of the molten film tube. Typical fan designs have well defined and wide range of operating characteristics, published as "fan curves", easily chosen by those skilled in the art. To simplify adjustment of predetermined pressure differential, allow for a broader selection of variable exhaust device, and further prevent hang ups, a flow buffer is preferably added to each enclosure to allow gas to exchange between the cavity and the surrounding atmosphere. The simplest form of a flow buffer is a passage through the wall of the enclosure fluidly connecting the cavity to the surrounding atmosphere. As gas flow through the variable exhaust device is adjusted relative to the cooling gas cavity portion, a flow of gas through the passage occurs. The flow of gas through the passage creates an associated passage pressure drop relative to surrounding atmospheric pressure, which establishes cavity pressure to create the desired predetermined pressure differential. The variable exhaust device and passage are sized to generate the desired range of predetermined pressure differential, over the expected range of cooling gas flow, acting together to form a fast acting cavity pressure regulator.

Advantageously, a freely swinging flapper hangs by gravity generally inside the flow buffer passage. When cavity pressure equals atmospheric pressure, no gas flows through the passage, and the flapper hangs straight down creating a maximum obstruction in the passage. As predetermined pressure differential adjustments are made, gas flow through the passage changes, causing a variable deflection of the flapper which variably obstructs the passage in the direction the flow of gas through the passage. The position of the flapper provides an easy to interpret, visual indication of direction and quantity of the flow of gas through the passage.

Pressure regulating characteristics of the flow buffer can easily be set by giving the flapper a predetermined weight and geometry. The geometry of the passage can also take many forms (i.e. shapes) to achieve very smooth, fast acting pressure regulation, easily adjusted by the variable exhaust device. Embodiments of the flow buffer include more complex designs provided they allow for variable gas exchange with associated defined pressure drop between the cavity and the surrounding atmosphere.

Embodiments of the disclosure and the divergent cooling elements as described herein can operably be arranged in a four (4) element short stack configuration topped with a dual flow air ring, as is described in co-pending application titled High Performance Cooling Element filed on Jan. 15, 2016, with first named inventor Robert E. Cree, filed under Ser. 14/997,157, hereby incorporated by reference. Stable operation of the embodiments of this disclosure can be achieved with a spaced apart dimension between cooling elements greater than 4 inches. Further, zero internal pressure within the molten film tube can be achieved, providing stable straight up (from the final cooling element) tube formation. Additionally, internal tube pressure can be increased yielding the full range of larger film sizes normally able to be produced. Throughput rates can be increased in excess of 65% over conventional Dual Flow cooling means.

FIG. 1 shows a cross sectional view of a typical blown film extrusion process employing an enclosure 28 of the present invention with a short stack cooling system. In FIG. 1-FIG. 6, all thin arrows indicating a direction are for illustrative purposes only, labeled for example as AF, and indicate a direction flow of a fluid (e.g. cooling gas). Further, Thick arrows indicating a direction are for illustrative purposes only, labeled for example as MF, and indicate a direction flow of a plastic film material (e.g. molten film tube). Thermoplastic resin is introduced through feed hopper 2 into extruder 4 where the resin is melted, mixed and pressurized. Molten resin is conveyed through melt pipe 6 into a die means 8 that forms it into an annular molten flow that exits generally from the top surface of die means 8 as a molten film tube 12.

Internal gas supply conduit 10 operably provides an internal cooling/inflating gas through die means 8 to the interior of molten film tube 12 and solidified film tube 16. Internal gas exhaust conduit 9 operably removes internal cooling/inflating gas through die means 8 as required to maintain a desired trapped tube volume of gas inside molten film tube 12 and solidified film tube 16, further contained by nip rollers 20. Gas flow through Internal gas supply conduit 10 and Internal gas exhaust conduit 9 are controlled by methods commonly understood by those skilled in the art. Molten film tube 12 expands outwardly around the trapped tube volume of gas and is drawn upwardly by nip rollers 20 while being cooled to solidify at freeze line 14 forming solidified film tube 16. Solidified film tube 16 is collapsed by flattening guides 18 before passing through nip rollers 20 forming flattened film 22. Flattened film 22 is then conveyed to downstream equipment for conversion into usable products as desired.

Annular cooling elements 23, 24a-d, and 26 are arranged coaxial with and in the direction of flow of molten film tube 12. Cooling elements 23, 24a-d, and 26, each supplied with cooling gas from a suitable external source, direct associated cooling gas alongside molten film tube 12, generally in the same and/or opposite direction to the flow of molten film tube 12, acting to stabilize and cool molten film tube 12.

Upward cooling gas traveling generally in the direction of flow of molten film tube 12 from cooling elements 23 and 24a-c, and downward cooling gas traveling generally opposite the direction of flow of molten film tube 12 from cooling elements 24a-d flows directly into a cavity C around molten film tube 12. Cavity C is contained and isolated from the surrounding atmosphere by enclosure 28 with additional extents formed by the portion of the cooling elements 23 and 24a-d in contact with cavity C (cooling element cavity portion), and the portion of the molten film tube 12 in contact with cavity C (molten film cavity portion). Cooling gas entering cavity C flows alongside and cools molten film tube 12, and exhausts between cooling elements 23 and 24a-d, and is collected for further processing by enclosure 28. Generally upwardly directed cooling gas from cooling element 26 flows unrestricted, along molten film tube 12, directly influenced by the surrounding atmosphere, while cooling and allowing for free expansion of molten film tube 12.

Variable exhaust device 30, installed in a port passing through enclosure 28, conveys gas from cavity C to the surrounding atmosphere. The choice of variable exhaust device 30 is important. If variable exhaust device 30 is too big or powerful, excessive cavity C pressures could develop inside enclosure 28 sufficient to cause hang-ups of molten film tube 12. Variable exhaust device 30 is preferably chosen to be of a low pressure, high flow design, sufficient to provide desired pressures and flows. The pressure of cavity C relative to the surrounding atmosphere is adjusted by variable exhaust device 30 using a variable controller means 32, to create a predetermined pressure differential across the molten film cavity portion that maximizes the stability of the molten film cavity portion and the cooling efficiency of the cooling element cavity portion, to provide higher throughput rate, and better film quality.

Embodiments of enclosure 28 may include a flow buffer 34, minimally including a passage through the wall of enclosure 28 fluidly connecting cavity C to the surrounding atmosphere. As gas flow through the variable exhaust device 30 is adjusted relative the cooling gas entering cavity C, the flow of gas through flow buffer 34 changes. The flow of gas flow buffer 34 creates an associated pressure drop relative to surrounding atmospheric pressure, which establishes cavity C pressure and the associated predetermined pressure differential across the molten film cavity portion.

Selectively added freely swinging flapper 36 hangs by gravity generally inside the passage of flow buffer 34. When cavity C pressure equals atmospheric pressure, no gas flows through flow buffer 34, and the flapper hangs straight down creating a maximum obstruction in the passage. As predetermined pressure differential adjustments are made, gas flows through flow buffer 34, causing a variable deflection of flapper 36 which variably obstructs flow buffer 34 in the direction the flow of gas through the passage. The position of flapper 36 provides an easy to interpret, visual indication of direction and quantity of the flow of gas through flow buffer 34. Depending on the choice of variable exhaust device 30, the characteristics of optional flow buffer 34 can easily be set by predetermining the weight and geometry of flapper 36 and the passage geometry of flow buffer 34 to achieve very smooth, fast acting regulation of cavity C pressure, over the desired range of predetermined pressure differential across the molten film cavity portion, adjustable by variable controller means 32.

Figure 2:
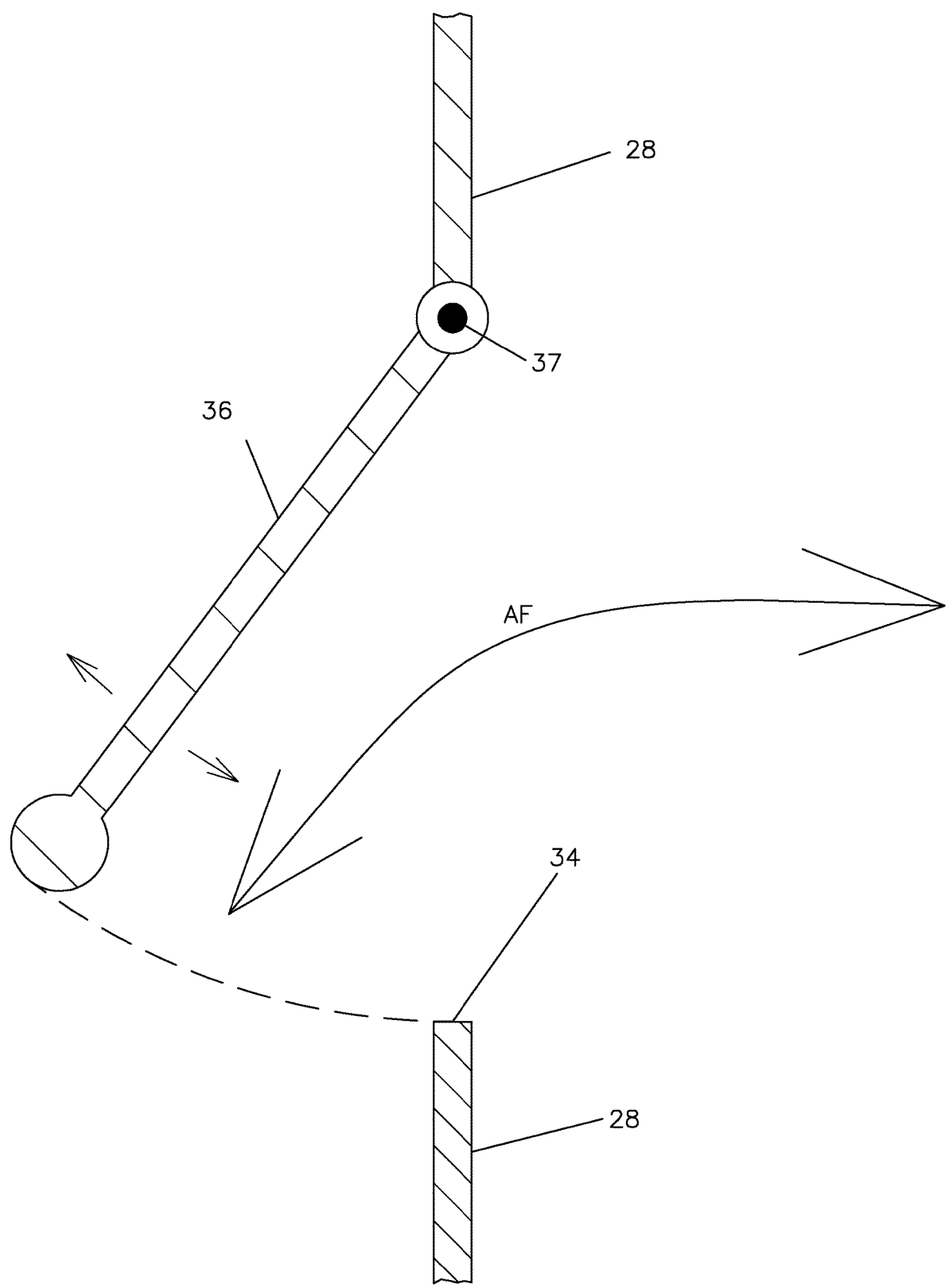
FIG. 2 is a close-up view of an exemplary flow buffer suitable for use in practicing exemplary embodiments of this disclosure.

FIG. 2 shows a magnified partial cross sectional view enclosure 28 with optional flow buffer 34 including flapper 36. Enclosure 28 is provided with optional flow buffer 34 installed minimally as a passage through the wall of enclosure 28 and includes freely swinging flapper 36 that hangs by gravity generally inside the passage of flow buffer 34 and swings freely about pivot 37. Air is allowed to pass in either direction through flow buffer 34, between the internal portion of enclosure 28 (cavity C) and the surrounding atmosphere, creating an associated pressure differential across flow buffer 34. As air flows in either direction through flow buffer 34, freely swinging flapper 36 rotates about pivot 37 to move under the influence of gravity, in the direction of air flow or to hang straight down under a no flow condition forming a flow dependent variable cross section within flow buffer 34 formed between the passage extents and flapper 36. Pressure regulating characteristics of flow buffer 34 can easily be set by adjusting associated passage geometry and the geometry and weight of freely swinging flapper 36 to achieve very smooth, fast acting pressure regulation of cavity C, contained inside enclosure 28.

Figure 3:
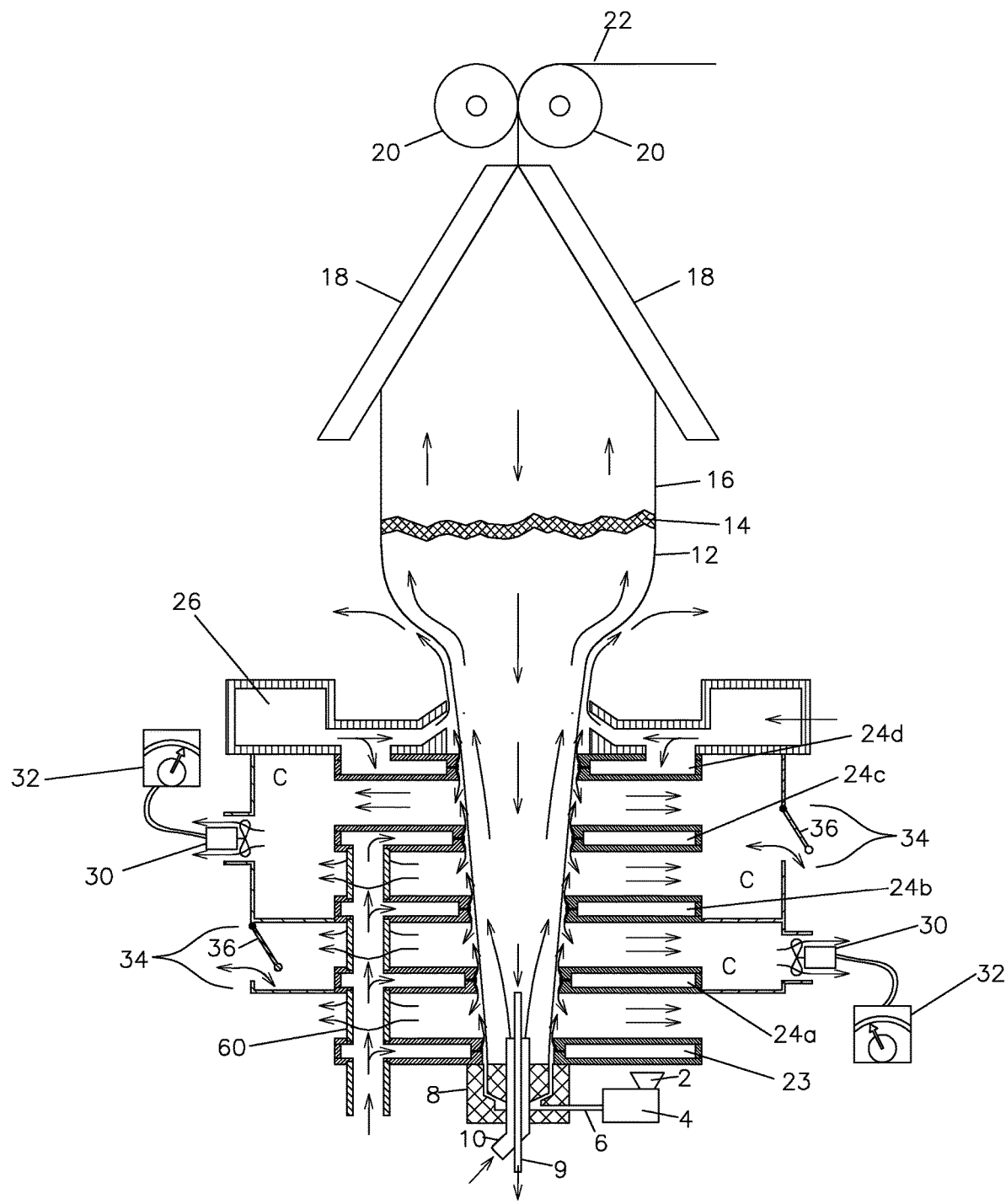
FIG. 3 is a close-up cross sectional view of an alternative exemplary cooling element suitable for use in practicing exemplary embodiments of this disclosure.

FIG. 3 shows a cross sectional view of a typical blown film extrusion process with a short stack cooling system employing multiple enclosures 28 of the present invention. Each enclosure 28, is adjusted by an associated variable controller means 32 acting on an associated variable exhaust device 30, and associated optional flow buffer 34 with further optional freely swinging flapper 36, each enclosure 28 acting independently on one or more associated cooling element(s) as previously described. Further, the area between cooling elements 23 and 24a is shown without an associated enclosure 28, forming an uncontrolled area directly influenced by the surrounding atmosphere. Any number of enclosures 28 and uncontrolled areas can be employed in any order, each incorporating any number of cooling elements. Additionally, the number of cooling elements present in the stack is not limited and can be as many or as few, as is desired, including the full stack cooling system thoroughly described in prior art.

The short stack cooling system depicted, preferentially includes high performance, divergent cooling elements described in co-pending application titled High Performance Cooling Element filed on Jan. 15, 2016, with first named inventor Robert E. Cree, filed under Ser. No. 14/997,157, the contents of which is hereby incorporated by reference. Cooling gas supply conduits 60, spaced generally inside and around the perimeter of cooling elements 23, 24a, 24b and 24c, forming a common supply of cooling gas and allowing exhaust gas to flow between adjacent cooling gas supply conduits 60, such as is well known and described in prior art stackable cooling systems. Cooling gas supply conduits 60 also act to space apart and locate concentric to molten film tube 12 each of the associated cooling elements 23, 24a, 24b and 24c. Cooling element 24d is advantageously shown supplied with cooling gas in common with cooling element 26, forming a high performance triple flow air ring at the top of the stack. Cooling element 26 is shown as a single flow air ring, but can include more than one flow of cooling gas forming a multiple flow air ring, exiting to flow unrestricted, generally upward and along molten film tube 12, directly influenced by the surrounding atmosphere, while cooling and allowing for free expansion of molten film tube 12. Cooling element 26 may also be omitted, allowing cooling gas exiting from the upper most located high performance, divergent cooling element 24d, with frost line 14 either located above the upper most divergent cooling element 24d and allow for free expansion of molten film tube 12 or within or below the upper most divergent cooling element 24d to constrain the molten film tube 12.

Figure 4:
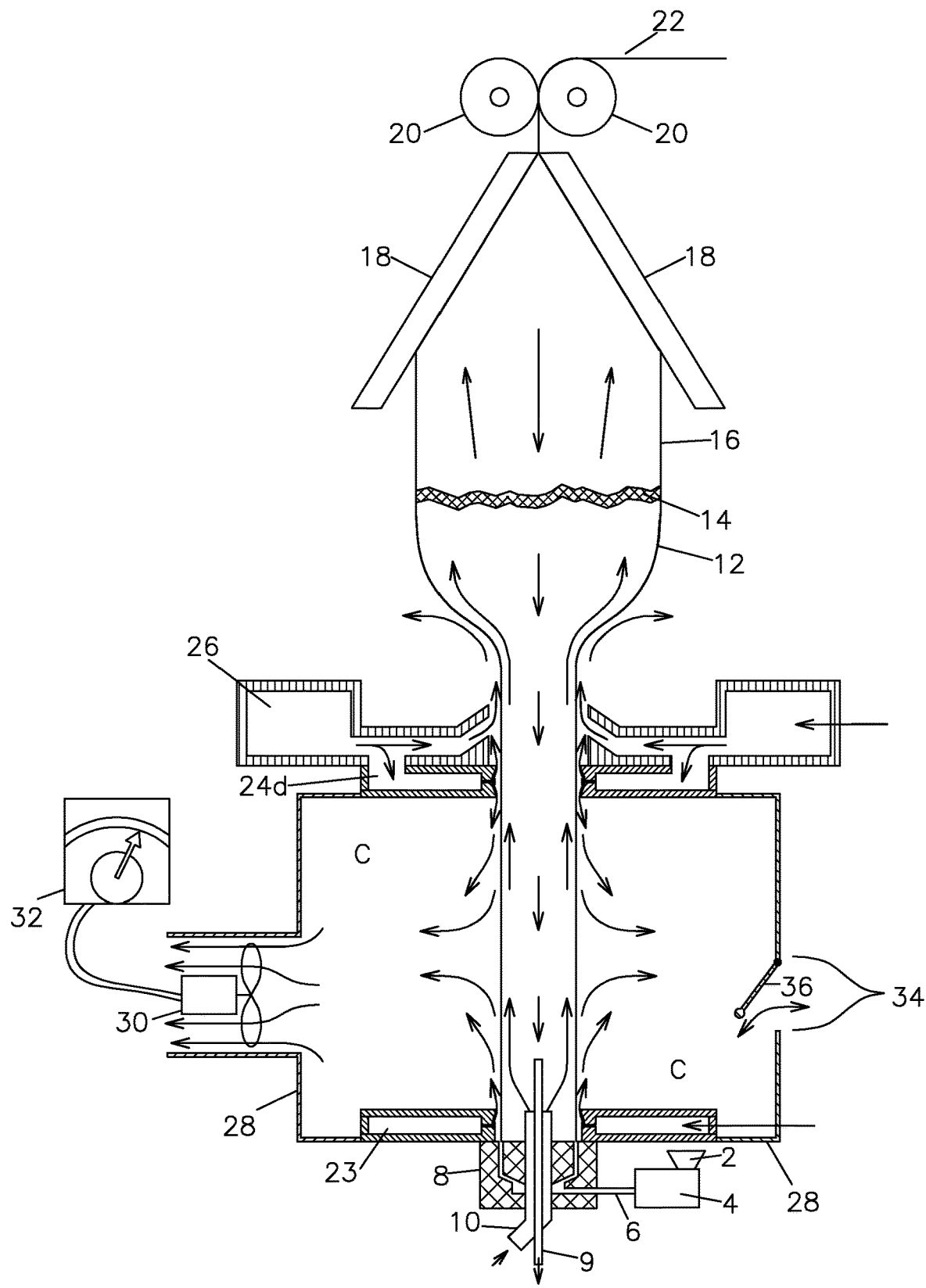
FIG. 4 is a cross sectional view of an alternative device suitable for use in practicing exemplary embodiments of this disclosure.

FIG. 4 shows a cross sectional view of a typical blown film extrusion process with tandem air ring cooling system employing enclosure 28 of the present invention. Cooling element 23 is depicted as, but not limited to a single flow design, providing cooling gas directly into the lower portion of cavity C associated with enclosure 28. Cooling element 26 is depicted as, but not limited to a triple flow design, in this case, providing a portion of its cooling gas directly into the upper portion of cavity C of enclosure 28. The cavity C pressure within enclosure 28 is adjusted by associated variable controller means 32 acting on variable exhaust device 30, and optional flow buffer 34 with freely swinging flapper 36, such that molten film tube 12 is urged into optimized cooling proximity with associated cooling elements 23, 24d and 26, resulting in improved throughput rate and film quality.

Figure 5:
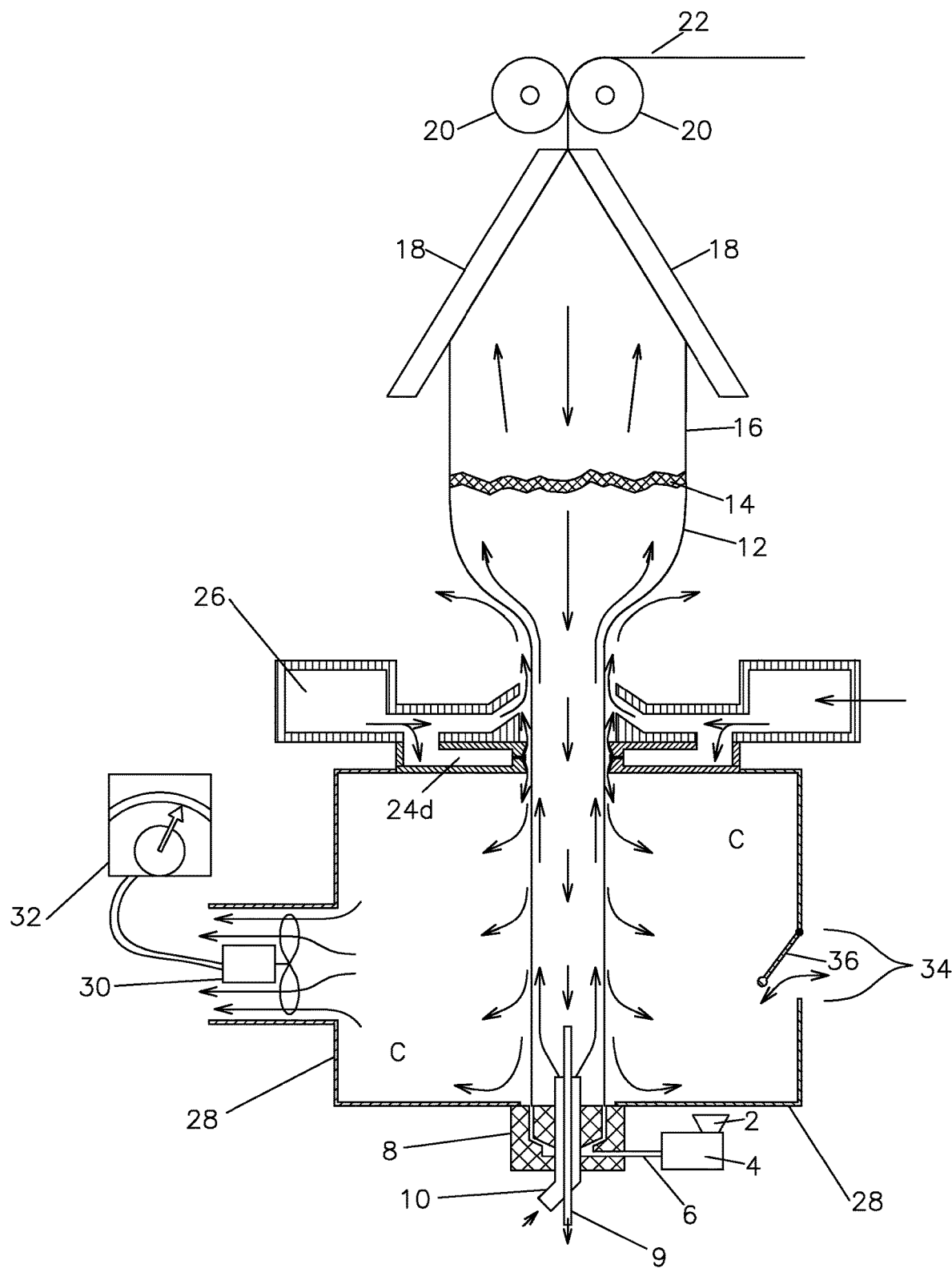
FIG. 5 is a cross sectional view of yet another device suitable for use in practicing exemplary embodiments of this disclosure.

FIG. 5 shows a cross sectional view of a typical blown film extrusion process with a raised up triple flow cooling system, employing enclosure 28 of the present invention. The lower portion of enclosure 28 is preferably sealed as shown to the top of die 8, or optionally can be spaced apart intermediate die 8 and cooling element 26, forming an annular barrier surrounding, but not contacting molten film tube 12. Cooling element 26 is depicted as, but not limited to a triple flow design, such that at least a portion of its associated cooling gas is provided directly into the upper portion of cavity C associated with enclosure 28. The pressure within enclosure 28 is adjusted as previously described, by associated variable controller means 32 acting on variable exhaust device 30, and optional flow buffer 34 with further optional freely swinging flapper 36, such that molten film tube 12 is urged into optimized cooling proximity with associated cooling elements 24d and 26, resulting in improved throughput rate and film quality.

Figure 6:
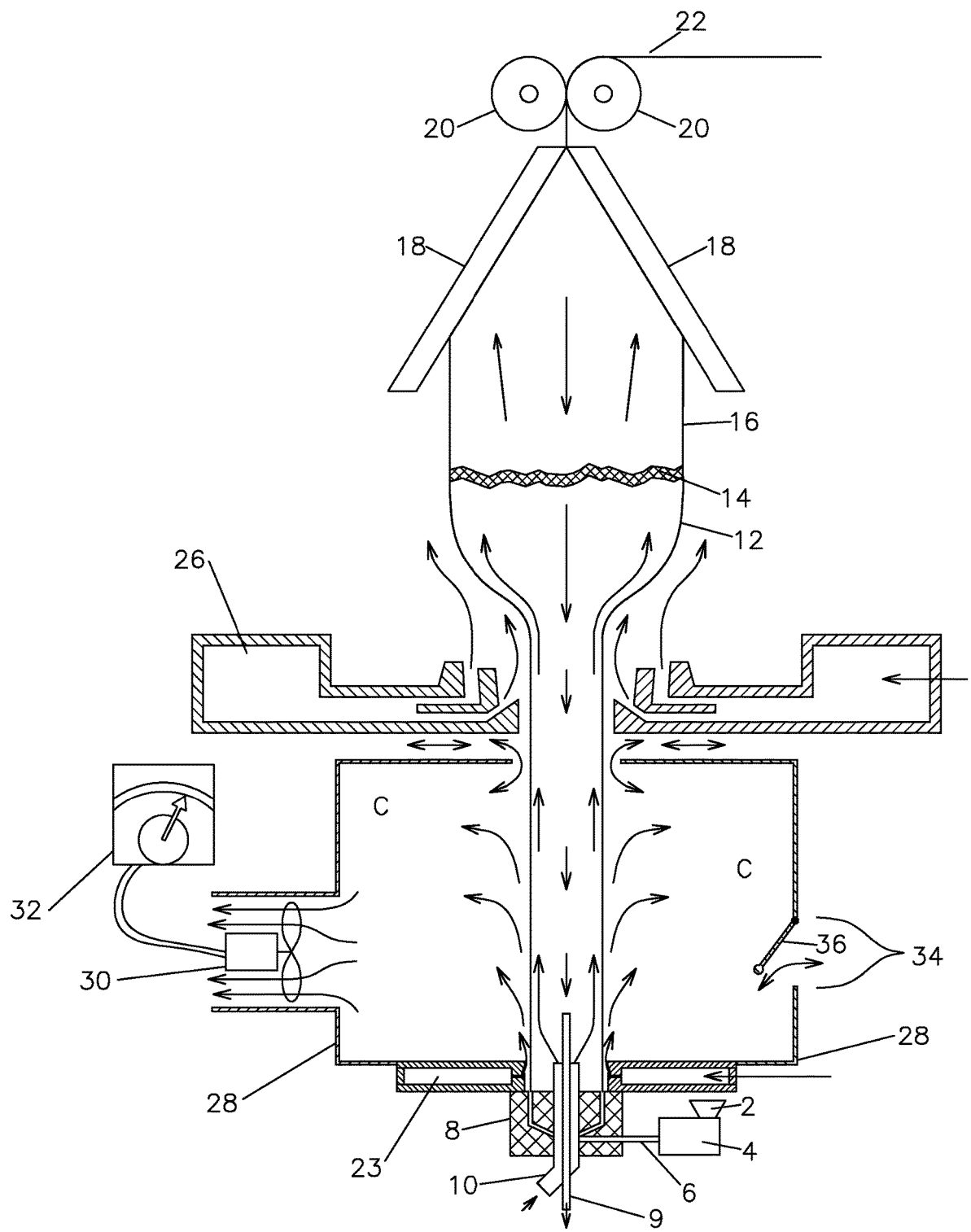
FIG. 6 is a cross sectional view of yet another device suitable for use in practicing exemplary embodiments of this disclosure.

FIG. 6 shows a cross sectional view of a typical blown film extrusion process with tandem air ring cooling system employing enclosure 28 of the present invention. Cooling element 23 is depicted as, but not limited to a single flow design, providing cooling gas directly into the lower portion of cavity C associated with enclosure 28. Cooling element 26 is depicted as, but not limited to a dual flow design, preferably spaced above enclosure 28 disposed in this case, to form an annular barrier surrounding, but not contacting molten film tube 12, acting to isolate enclosure 28's influence on cooling element 26. Alternatively, cooling element 26 can form the upper extent of enclosure 28 if desired, similar to the cooling system of FIG. 4, but as a dual flow air ring without a divergent cooling element (FIG. 4 24d). The pressure within cavity C associated with enclosure 28 is adjusted as previously described, by associated variable controller means 32 acting on variable exhaust device 30, and optional flow buffer 34 with further optional freely swinging flapper 36, such that molten film tube 12 is urged into optimized cooling proximity with associated cooling element 23 and to a smaller degree (due to the remoteness), cooling element 26, resulting in improved throughput rate and film quality.

The present invention is presented on an upward blown film extrusion process, but equally applies to horizontal or downward versions of the blown film extrusion process, without limit.

Figure 7:
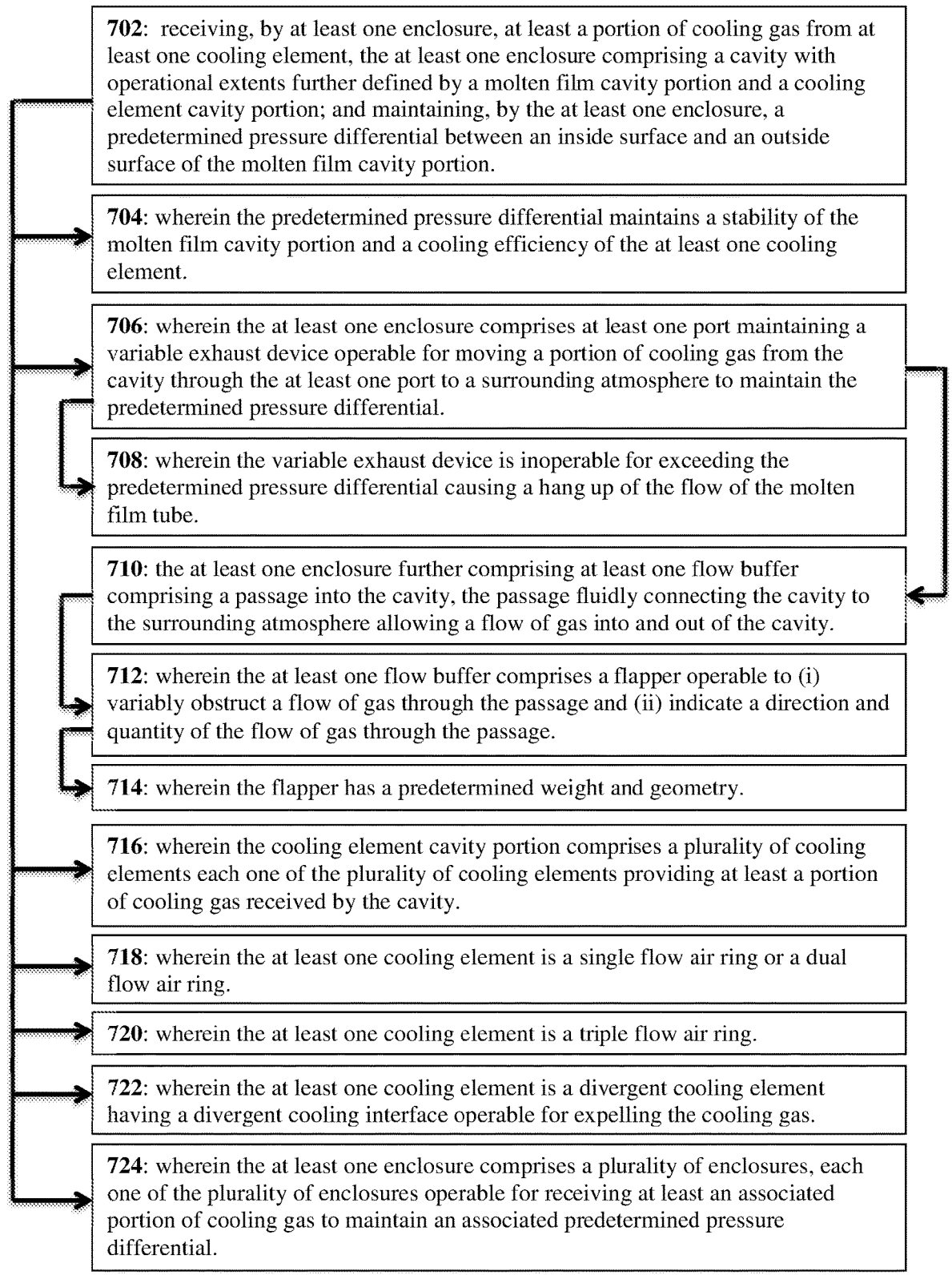
FIG. 7 is a logic flow diagram in accordance with a method and apparatus for performing exemplary embodiments of this disclosure.

Referring to FIG. 7, presented is a logic flow diagram in accordance with a method and apparatus for performing exemplary embodiments of this disclosure. Block 702 presents receiving, by at least one enclosure, at least a portion of cooling gas from at least one cooling element, the at least one enclosure comprising a cavity with operational extents further defined by a molten film cavity portion and a cooling element cavity portion; and maintaining, by the at least one enclosure, a predetermined pressure differential between an inside surface and an outside surface of the molten film cavity portion. Then block 704 presents wherein the predetermined pressure differential maintains a stability of the molten film cavity portion and a cooling efficiency of the at least one cooling element.

Some of the non-limiting implementations detailed above are also summarized at FIG. 7 following block 704. Block 706 relates to wherein the at least one enclosure comprises at least one port maintaining a variable exhaust device operable for moving a portion of cooling gas from the cavity through the at least one port to a surrounding atmosphere to maintain the predetermined pressure differential. Then block 708 states wherein the variable exhaust device is inoperable for exceeding the predetermined pressure differential causing a hang up of the flow of the molten film tube. Block 710 then further specifies the at least one enclosure further comprising at least one flow buffer comprising a passage into the cavity, the passage fluidly connecting the cavity to the surrounding atmosphere allowing a flow of gas into and out of the cavity.

Following block 710, block 712 relates to wherein the at least one flow buffer comprises a flapper operable to (i) variably obstruct a flow of gas through the passage and (ii) indicate a direction and quantity of the flow of gas through the passage. Block 714 then states wherein the flapper has a predetermined weight and geometry. Block 716 then specifies wherein the cooling element cavity portion comprises a plurality of cooling elements each one of the plurality of cooling elements providing at least a portion of cooling gas received by the cavity.

Block 718 then relates to wherein the at least one cooling element is a single flow air ring or a dual flow air ring. Block 720 states wherein the at least one cooling element is a triple flow air ring. Then block 722 specifies wherein the at least one cooling element is a divergent cooling element having a divergent cooling interface operable for expelling the cooling gas. Finally block 724 indicates wherein the at least one enclosure comprises a plurality of enclosures, each one of the plurality of enclosures operable for receiving at least an associated portion of cooling gas to maintain an associated predetermined pressure differential.

The logic flow diagram may be considered to illustrate the operation of a method. The logic flow diagram may also be considered a specific manner in which components of a device are configured to cause that device to operate, whether such a device is a blown film tubular extrusion device, controlled pressure enclosure, or divergent cooling element, or one or more components thereof.

Embodiments of the present invention has been described in detail with particular reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for cooling, the apparatus comprising:
at least one enclosure comprising a cavity with operational extents further defined by a molten film cavity portion and a cooling element cavity portion, the cavity operable for receiving at least a portion of cooling gas from at least one cooling element, wherein the at least one enclosure is operable to maintain a predetermined pressure differential between an inside surface and an outside surface of the molten film cavity portion, the at least one enclosure comprising at least one flow buffer comprising a passage into the cavity, the passage fluidly connecting the cavity to the surrounding atmosphere allowing a flow of gas into and out of the cavity.

2. The apparatus according to claim 1, wherein the predetermined pressure differential maintains a stability of the molten film cavity portion and a cooling efficiency of the at least one cooling element.

3. The apparatus according to claim 2, the at least one enclosure further comprising at least one port maintaining a variable exhaust device operable for moving a portion of cooling gas from the cavity through the at least one port to a surrounding atmosphere to maintain the predetermined pressure differential.

4. The apparatus according to claim 3, wherein the variable exhaust device is inoperable for exceeding the predetermined pressure differential causing a hang up of a flow of a molten film tube.

5. The apparatus according to claim 1, wherein the at least one flow buffer comprises a flapper operable to (i) variably obstruct a flow of gas through the passage and (ii) indicate a direction and quantity of the flow of gas through the passage.

6. The apparatus according to claim 5, wherein the flapper has a predetermined weight and geometry.

7. The apparatus according to claim 1, wherein the cooling element cavity portion comprises a plurality of cooling elements, each one of the plurality of cooling elements providing at least a portion of the cooling gas received by the cavity.

8. The apparatus according to claim 1, wherein the at least one cooling element is a single flow air ring or a dual flow air ring.

9. The apparatus according to claim 1, wherein the at least one cooling element is a triple flow air ring.

10. The apparatus according to claim 1, wherein the at least one cooling element is a divergent cooling element having a divergent cooling interface operable for expelling the cooling gas.

11. The apparatus according to claim 1, wherein the at least one enclosure comprises a plurality of enclosures, each one of the plurality of enclosures operable for receiving at least an associated portion of cooling gas to maintain an associated predetermined pressure differential.

12. A method for cooling, the method comprising:
(a) receiving, by at least one enclosure, at least a portion of cooling gas from at least one cooling element, the at least one enclosure comprising a cavity with operational extents further defined by a molten film cavity portion and a cooling element cavity portion; and
(b) maintaining, by the at least one enclosure, a predetermined pressure differential between an inside surface and an outside surface of the molten film cavity portion, the at least one enclosure further comprising at least one flow buffer comprising a passage into the cavity, the passage fluidly connecting the cavity to the surrounding atmosphere allowing a flow of gas into and out of the cavity.

13. The method according to claim 12, wherein the predetermined pressure differential maintains a stability of the molten film cavity portion and a cooling efficiency of the at least one cooling element.

14. The method according to claim 12, wherein the at least one enclosure comprises at least one port maintaining a variable exhaust device operable for moving a portion of cooling gas from the cavity through the at least one port to a surrounding atmosphere to maintain the predetermined pressure differential.

15. The method according to claim 14, wherein the variable exhaust device is inoperable for exceeding the predetermined pressure differential causing a hang up of a flow of a molten film tube.

16. The method according to claim 14, wherein the at least one flow buffer comprises a flapper operable to (i) variably obstruct a flow of gas through the passage and (ii) indicate a direction and quantity of the flow of gas through the passage.

17. The method according to claim 16, wherein the flapper has a predetermined weight and geometry.

18. The method according to claim 12, wherein the cooling element cavity portion comprises a plurality of cooling elements each one of the plurality of cooling elements providing at least a portion of cooling gas received by the cavity.

19. The method according to claim 12, wherein the at least one cooling element is a single flow air ring or a dual flow air ring.

20. The method according to claim 12, wherein the at least one cooling element is a triple flow air ring.

21. The method according to claim 12, wherein the at least one cooling element is a divergent cooling element having a divergent cooling interface operable for expelling the cooling gas.

22. The method according to claim 12, wherein the at least one enclosure comprises a plurality of enclosures, each one of the plurality of enclosures operable for receiving at least an associated portion of cooling gas to maintain an associated predetermined pressure differential.

* * * * *